(12) United States Patent
Sullivan et al.

(10) Patent No.: US 6,749,038 B2
(45) Date of Patent: Jun. 15, 2004

(54) TENSION SENSING ASSEMBLY

(75) Inventors: Stuart S. Sullivan, Peru, IN (US); Morgan D. Murphy, Kokomo, IN (US); Phillip E Kaltenbacher, II, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/079,131

(22) Filed: Feb. 20, 2002

(65) Prior Publication Data

US 2003/0155166 A1 Aug. 21, 2003

(51) Int. Cl.7 ............................................. B60R 21/00
(52) U.S. Cl. .................................... 180/268; 280/801.1
(58) Field of Search ............................. 280/801.1, 802; 180/270, 286, 268; 24/633

(56) References Cited

U.S. PATENT DOCUMENTS

| 6,230,088 | B1 | 5/2001 | Husby |
| 6,508,114 | B2 | 1/2003 | Lawson |
| 6,520,540 | B1 | 2/2003 | Siegfried et al. |

Primary Examiner—Paul N. Dickson
Assistant Examiner—Faye M. Fleming
(74) Attorney, Agent, or Firm—Scott A. McBain

(57) ABSTRACT

A tension sensing assembly for a seat restraint system in a vehicle includes a housing for operative connection to vehicle structure and at least one spring disposed in the housing. The tension sensing assembly also includes at least one magnet disposed in the housing and a Hall effect sensor disposed in the housing and cooperable with the at least one magnet. The tension sensing assembly further includes a movable mechanism at least partially disposed in the housing and cooperable with belt webbing of the seat restraint system and the at least one spring to move the at least one magnet relative to the Hall effect sensor to change an output of the Hall effect sensor to indicate a first tension level and a second tension level in the seat restraint system when the at least one spring is deflected.

20 Claims, 3 Drawing Sheets

TENSION SENSING ASSEMBLY

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Therefore, it is desirable to provide an assembly for sensing tension in a seat restraint system of a vehicle. It is also desirable to provide an assembly for a seat restraint system in a vehicle that allows a control module to determine the difference between either a child seat or a small occupant. It is further desirable to provide an assembly for a seat restraint system in a vehicle that provides an indication of low tension forces while preventing audible noise due to rattle and provide an indication of high tension forces in the seat restraint system.

SUMMARY OF THE INVENTION

It is, therefore, one object of the present invention to provide a tension sensing assembly for sensing tension in a seat restraint system of a vehicle.

It is another object of the present invention to provide an assembly for dual level tension sensing in a seat restraint system of a vehicle.

To achieve the foregoing objects, the present invention is a tension sensing assembly for a seat restraint system in a vehicle including a housing for operative connection to vehicle structure and at least one spring disposed in the housing. The tension sensing assembly also includes at least one magnet disposed in the housing and a Hall effect sensor disposed in the housing and cooperable with the at least one magnet. The tension sensing assembly further includes a movable mechanism at least partially disposed in the housing and cooperable with belt webbing of the seat restraint system and the at least one spring to move the at least one magnet relative to the Hall effect sensor to change an output of the Hall effect sensor to indicate a first tension level and a second tension level in the seat restraint system when the at least one spring is deflected.

One advantage of the present invention is that a new tension sensing assembly is provided for a seat restraint system in a vehicle. Another advantage of the present invention is that the tension sensing assembly senses tension in the seat restraint system to help identify what is occupying the seat, either a child, child seat, or low mass adult. Yet another advantage of the present invention is that the tension sensing assembly has dual level tension sensing. Still another advantage of the present invention is that the tension sensing assembly employs dual level spring operation to provide sensing device travel at low tension forces, prevent rattle, and still provide output at higher forces. A further advantage of the present invention is that the tension sensing assembly has greater output at lower tensions and greater control of output. Yet a further advantage of the present invention is that the tension sensing assembly may use ortho-planar or flat springs and reduce assembly forces to ease automated assembly.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
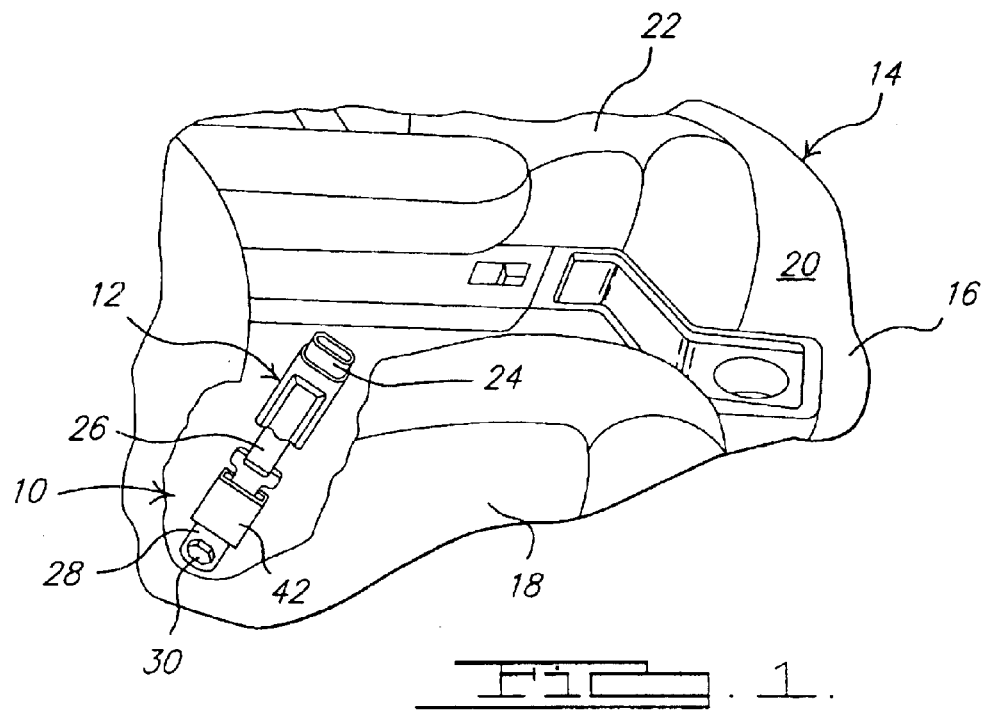
FIG. 1 is a perspective view of a tension sensing assembly, according to the present invention, illustrated in operational relationship with a seat restraint system of a vehicle.
Figure 2:
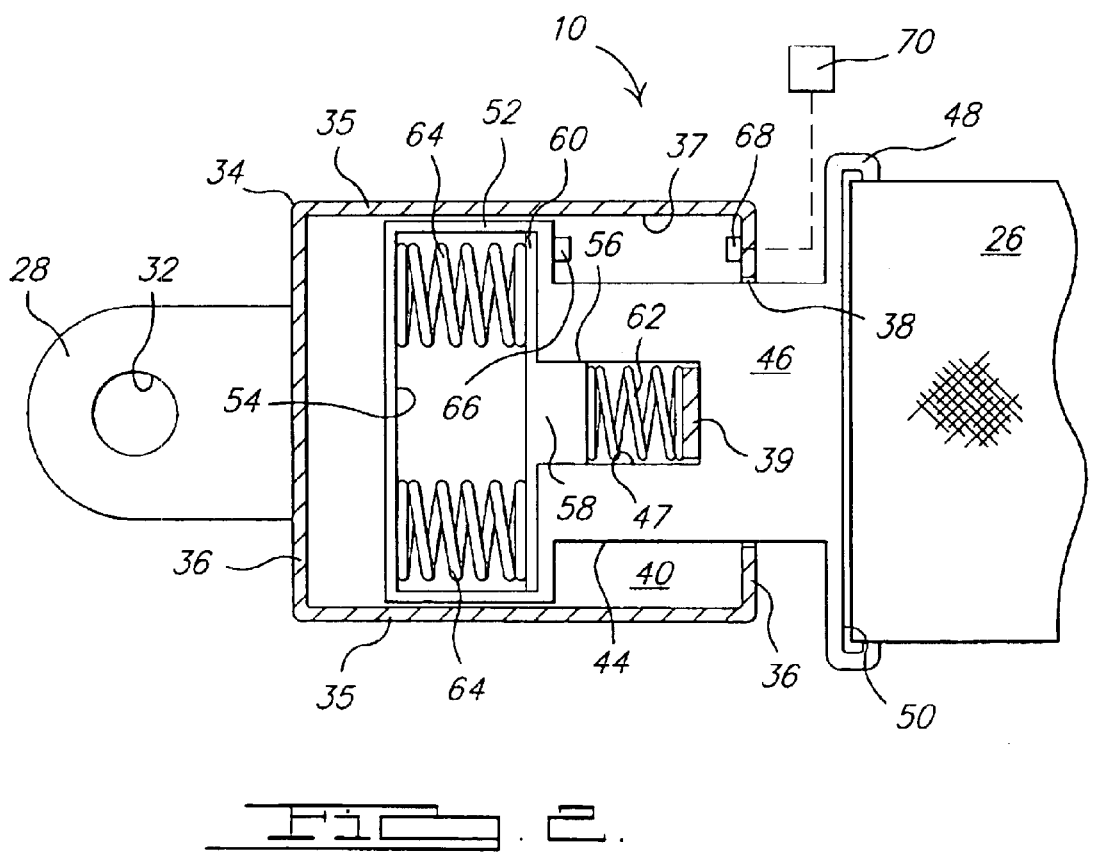
FIG. 2 is a fragmentary plan view of the tension sensing assembly of FIG. 1.

Referring to the drawings and in particular FIGS. 1 and 2, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row, or third row seat for the vehicle 14.

Referring to FIGS. 1 and 2, the vehicle 14 includes the seat restraint system 12 for restraining an occupant (not shown) in the seat 18. The seat restraint system 12 includes a latch tongue or plate (not shown) connected to an end of either one of a lap belt, shoulder belt, or both (not shown) which have another end connected to a retractor (not shown). The seat restraint system 12 also includes a buckle assembly 24 connected by suitable means such as belt webbing 26 to the tension sensing assembly 10. The tension sensing assembly 10 is connected to the vehicle structure 20 in a manner to be described. It should be appreciated that the latch plate is engageable and disengageable with the buckle assembly 24. It should be appreciated that, except for the tension sensing assembly 10, the seat restraint system 12 and vehicle 14 are conventional and known in the art.

Figure 3:
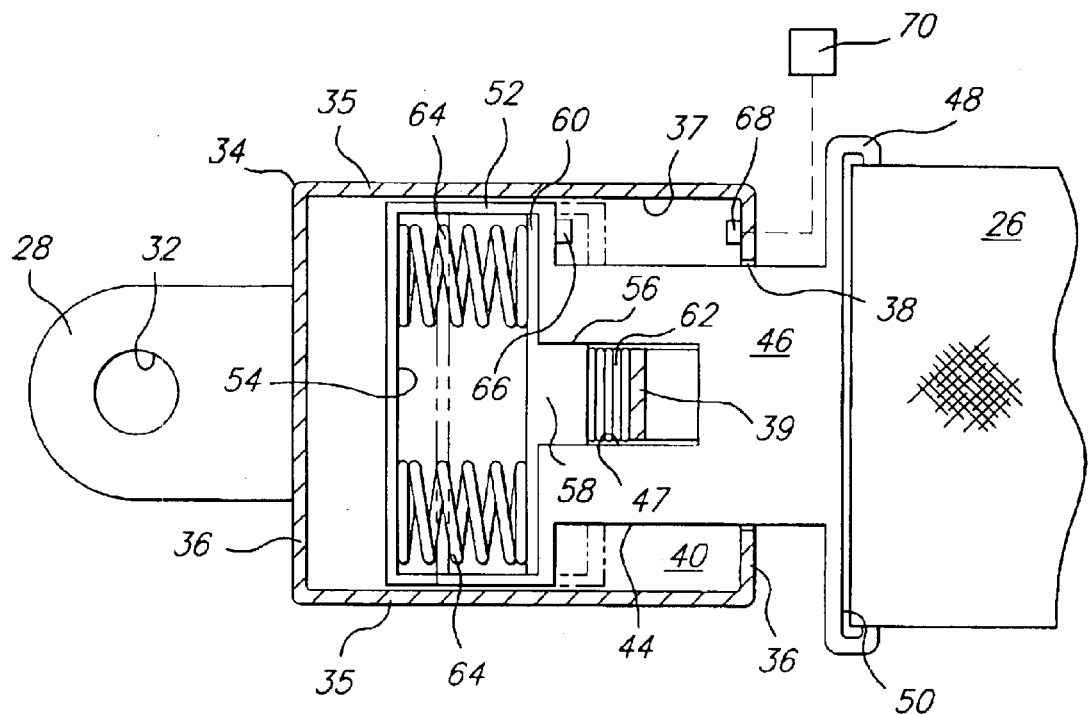
FIG. 3 is a view similar to FIG. 2 illustrating the tension sensing assembly in a low tension condition and a high tension condition.

Referring to FIGS. 1 through 3, the tension sensing assembly 10, according to the present invention, includes an anchor plate 28 extending axially and connected to vehicle structure by suitable means such as an anchor bolt 30. The anchor plate 28 has an aperture 32 extending therethrough to receive the anchor bolt 30. The anchor bolt 30 extends through the aperture 32 in the anchor plate 28 and the vehicle structure 20 and is secured in place by a nut (not shown). The anchor plate 28 is made of a rigid material such as metal. It should be appreciated that the anchor bolt 30 is conventional and known in the art. It should also be appreciated that the anchor plate 28 is fixed by the anchor bolt 30.

The tension sensing assembly 10 also includes a housing 34 mounted on or connected to the anchor plate 28. The housing 34 is generally rectangular in shape. The housing 34 has opposed lateral side walls 35 and longitudinal end walls 36 to form a cavity 37. One of the end walls 36 has an aperture 38 extending therethrough at a forward longitudinal end for a function to be described. The housing 34 also includes a stop 39 extending into the cavity 37 for a function to be described. The housing 34 is made of a rigid material such as plastic. It should be appreciated that the housing 34 has a bottom wall 40 and a top wall 42 that may be integral or attached thereto as illustrated in FIGS. 1 and 2. It should also be appreciated that the stop 39 may extend from either the bottom wall 40 or top wall 42.

The tension sensing assembly 10 includes a slider or tongue plate 44 connected to the belt webbing 26 and cooperating with the housing 34. The tongue plate 44 has a base portion 46 which is generally rectangular in shape and has a width the same as or less than a width of the aperture 38 of the housing 34. The base portion 46 extends through the aperture 38 of the housing 34. The base portion 46 has a slot 47 extending longitudinally therein to receive the stop 39 of the housing 34. It should be appreciated that the base portion 46 moves relative to the stop 39.

The tongue plate 44 also has a first end portion 48 connected to one end of the base portion 46 and disposed outside the housing 34. The first end portion 48 has a width greater than a width of the aperture 38 of the housing 34. The first end portion 48 includes an aperture 50 extending therethrough. The aperture 50 is generally rectangular in shape and receives one end of the belt webbing 26.

The tongue plate 44 further has a second end portion 52 connected to the other end of the base portion 46 and disposed inside the housing 34. The second end portion 52 has a width less than a width of the cavity 37 of the housing 34. The second end portion 52 includes an aperture 54 extending therethrough for a function to be described. The tongue plate 44 is made of a rigid material and formed as a monolithic structure being integral, unitary and formed as one-piece.

The tension sensing assembly 10 includes an actuator 56 disposed in the aperture 54 and slot 47. The actuator 56 is generally "T" shaped and has a first portion 58 extending longitudinally and disposed in the slot 47 for a function to be described. The actuator 56 also includes a second portion 60 extending laterally and disposed in the aperture 54. The second portion 60 has a width greater than a width of the first portion 58 and slot 47 but less than a width of the aperture 54. The actuator 56 is made of a rigid material and formed as a monolithic structure being integral, unitary and formed as one-piece.

The tension sensing assembly 10 includes a first spring 62 disposed in the slot 47 of the base portion 46 and within the cavity 37 of the housing 34 between the stop 39 and the first portion 58 of the actuator 56. The first spring 62 has a low spring constant. The first spring 62 is tuned to a predetermined force for comfort or low tension to have an output of approximately zero pounds (0 lb.) to approximately eight pounds (8 lb.). The first spring 62 is of a coil type having a first end contacting the stop 39 in the housing 34 and a second end contacting the first portion 58 of the actuator 56. The first spring 62 may also be of a flat or orthoplanar spring type. The first spring 62 is made of a spring material. It should be appreciated that the actuator 56 deflects the first spring 56 when the tongue plate 44 is moved relative to the housing 34.

The tension sensing assembly 10 includes at least one, preferably a plurality of, more preferably two, second springs 64 disposed in the aperture 54 within the cavity 37 of the housing 34 between the second end portion 52 of the tongue plate 44 and the second portion 60 of the actuator 56. The second springs 64 have a high spring constant. The second springs 64 are tuned to a predetermined force for a high tension condition to have an output of approximately eight pounds (8 lb.) to approximately thirty pounds (30 lb.). The second springs 64 are of a coil type having a first end contacting the second portion 60 of the actuator 56 and a second end contacting the second end portion 52 of the tongue plate 44. The second springs 64 may also be of a flat or orthoplanar spring type. The second springs 64 are made of a spring material. It should be appreciated that the second end portion 52 of the tongue plate 44 deflects the second springs 64 when the tongue plate 44 is moved relative to the housing 34. It should also be appreciated that the springs 62 and 64 may be replaced with one or more multi-level springs such as an ortho-planar spring developed by Brigham Young University, Provo, Utah.

Referring to FIGS. 2 and 3, the tension sensing assembly 10 includes at least one magnet 66 disposed in the cavity 37 of the housing 34. The magnet 66 is mounted on the tongue plate 44, preferably molded into the tongue plate 44. The tension sensing assembly 10 includes a Hall effect sensor 68 disposed in the cavity 37 of the housing 34. The Hall effect sensor 68 is spaced longitudinally from the magnet 66 and mounted to the end wall 36 of the housing 34 in a low tension condition. The magnet 66 is moved by the tongue plate 44 toward the Hall effect sensor 68 during a high tension condition. It should be appreciated that the tongue plate 44 moves as the springs 64 are deflected and this motion moves the magnet 66 closer to the Hall effect sensor 68 in a push-push arrangement. It should also be appreciated that the position of the magnet 66 relative to the Hall effect sensor 68 changes the output current of the Hall effect sensor 68. It should further be appreciated that the Hall effect sensor 68 may be mounted on a circuit board (not shown) connected to the end wall 36 and is potted and connected by electrical leads or wires to the source of power such as a controller 70 of the vehicle.

In operation of the tension sensing assembly 10, when the latch plate is not latched with the buckle assembly 24 as illustrated in FIG. 2, no signal is transmitted by the Hall effect sensor 68. It should be appreciated that the actuator 56 of the tension sensing assembly 10 is spring loaded to an initial position by the spring 62.

When the occupant buckles the seat restraint system 12, the tension in the belt webbing 26 is higher than a predetermined load required to deflect the spring 62 and the spring 62 is deflected or compressed by the actuator 56 as illustrated by the solid lines in FIG. 3. In this state, the seat restraint tension sensing assembly 10 will send a low voltage signal to the controller 70, causing the controller 70 to determine that a normal or large mass adult is present in the seat 18. It should be appreciated that the seat restraint system 12 is in a low-tension condition as illustrated by the solid lines in FIG. 3. It should also be appreciated that the low level spring 62 prevents audible noise due to rattle of the tension sensing assembly 10.

Figure 4:
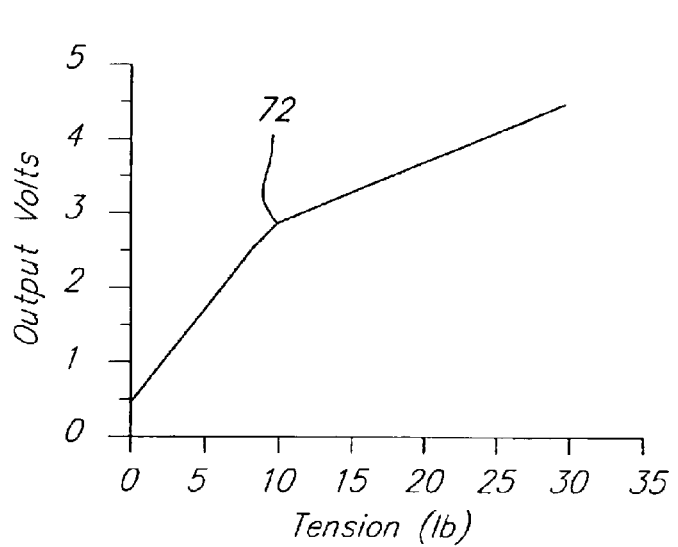
FIG. 4 is a graph of force versus displacement for the tension sensing assembly of FIG. 1.
Figure 5:
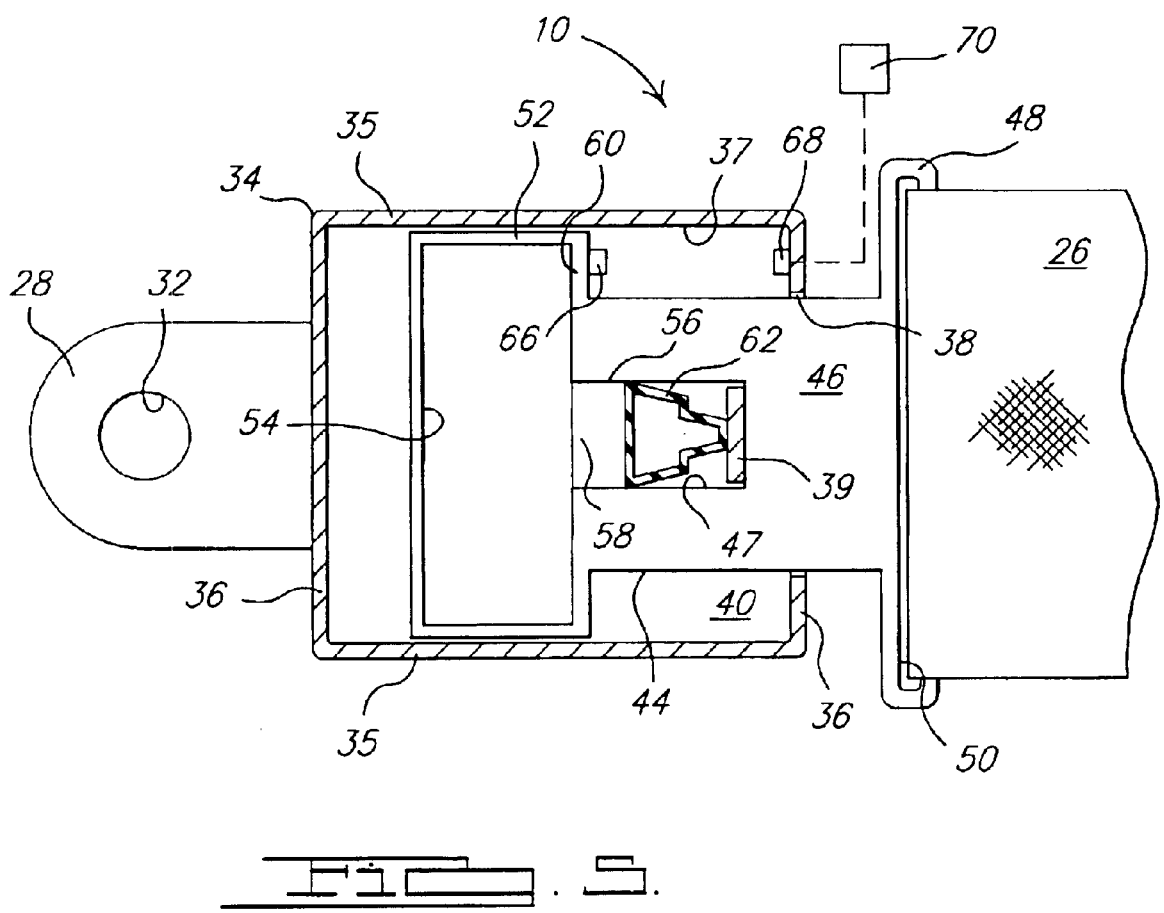
FIG. 5 is a fragmentary plan view of another embodiment, according to the present invention, of the tension sensing assembly of FIG. 1.

When a child seat (not shown) is placed in the seat 18 and the seat restraint system 12 is buckled, the belt webbing 26 is cinched to pull the child seat tightly into the seat 18. As the tension is increased in the belt webbing 26, the contact force on the tongue plate 44 increases. The resistive force of the springs 64 reacts against the increased tension. When the tension in the belt webbing 26 exceeds the predetermined load, the tongue plate 44 moves as the springs 64 are deflected or compressed, thereby moving the magnet 66 closer to the Hall effect sensor 68 in a push-push arrangement. This movement changes the output of the Hall effect sensor 68, causing the controller 70 to determine that a child seat is present in the seat 18. It should be appreciated that an audible tone or visual indication may be provided when the tension in the belt webbing 26 is increased above a predetermined level. It should also be appreciated that the low level spring 62 will deflect easily at low loads and, when fully compressed, transfers this load to the high level springs 64 to carry the load as illustrated at point 72 of a force-displacement graph 74 illustrated in FIG. 4.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing assembly for a seat restraint system in a vehicle comprising:
    a housing for operative connection to vehicle structure;
    at least one spring disposed in said housing and tuned to a predetermined force for a first tension level and a second tension level;
    at least one magnet disposed in said housing;
    a Hall effect sensor disposed in said housing and cooperable with said at least one magnet; and
    a movable mechanism at least partially disposed in said housing and cooperable with belt webbing of the seat restraint system and said at least one spring to move the at least one magnet relative to the Hall effect sensor to change an output of the Hall effect sensor to indicate the first tension level and the second tension level in the seat restraint system when said at least one spring is deflected.

2. A tension sensing assembly as set forth in claim 1 including a plurality of springs cooperating with said movable mechanism.

3. A tension sensing assembly for a seat restraint system in a vehicle comprising:
    a housing for operative connection to vehicle structure;
    at least one magnet disposed in said housing;
    a Hall effect sensor disposed in said housing and cooperable with said at least one magnet;
    a movable mechanism at least partially disposed in said housing and cooperable with belt webbing of the seat restraint system to move the at least one magnet relative to the Hall effect sensor to change an output of the Hall effect sensor to indicate a first tension level and a second tension level in the seat restraint system;
    a plurality of springs disposed in said housing and cooperating with said movable mechanism; and
    wherein at least one of said springs is tuned to a predetermined force for a low tension condition and said at least another of said springs is tuned to a predetermined force for a high tension condition.

4. A tension sensing assembly as set forth in claim 3 wherein said predetermined force for said low tension condition is zero pounds to eight pounds and said predetermined force for said high tension condition is eight pounds to thirty pounds.

5. A tension sensing assembly for a seat restraint system in a vehicle comprising:
    a housing for operative connection to vehicle structure;
    at least one spring disposed in said housing;
    at least one magnet disposed in said housing;
    a Hall effect sensor disposed in said housing and cooperable with said at least one magnet;
    a movable mechanism at least partially disposed in said housing and cooperable with belt webbing of the seat restraint system and said at least one spring to move the at least one magnet relative to the Hall effect sensor to change an output of the Hall effect sensor to indicate a first tension level and a second tension level in the seat restraint system when said at least one spring is deflected; and
    wherein said housing has a cavity with an aperture communicating with said cavity.

6. A tension sensing assembly as set forth in claim 5 including an anchor plate connected to said housing and adapted to be connected to the vehicle structure.

7. A tension sensing assembly for a seat restraint system in a vehicle comprising:
    a housing for operative connection to vehicle structure;
    at least one spring disposed in said housing;
    at least one magnet disposed in said housing;
    a Hall effect sensor disposed in said housing and cooperable with said at least one magnet;
    a movable mechanism at least partially disposed in said housing and cooperable with belt webbing of the seat restraint system and said at least one spring to move the at least one magnet relative to the Hall effect sensor to change an output of the Hall effect sensor to indicate a first tension level and a second tension level in the seat restraint system when said at least one spring is deflected;
    said housing having a cavity with an aperture communicating with said cavity; and
    wherein said movable mechanism comprises a tongue plate extending through said aperture and having a first end disposed in said cavity of said housing and a second end disposed outside said housing for connection to the belt webbing.

8. A tension sensing assembly as set forth in claim 7 wherein said movable mechanism further comprises a movable actuator disposed in said cavity of said housing and cooperating with said tongue plate.

9. A tension sensing assembly as set forth in claim 8 wherein said first end of said tongue plate has an aperture extending therethrough to receive said at least one spring and said actuator.

10. A tension sensing assembly as set forth in claim 8 wherein said magnet is mounted to said tongue plate and said Hall effect sensor is mounted to said housing.

11. A tension sensing assembly as set forth in claim 1 wherein said at least one spring is one of a group comprising a leaf spring, coil spring, and orthoplanar spring.

12. A dual level tension sensing assembly for a seat restraint system in a vehicle comprising:

an anchor plate adapted to be connected to vehicle structure;

a housing fixed to said anchor plate;

at least one spring disposed in said housing;

at least one magnet disposed in said housing;

a Hall effect sensor disposed in said housing and cooperable with said at least one magnet; and a movable mechanism disposed in said housing and cooperable with belt webbing of the seat restraint system and said at least one spring to move the at least one magnet relative to the Hall effect sensor to change an output of the Hall effect sensor to indicate a first tension level and a second tension level in the seat restraint system when said at least one spring is deflected.

13. A dual level tension sensing assembly as set forth in claim 12 wherein said housing has a cavity with an aperture communicating with said cavity.

14. A dual level tension sensing assembly for a seat restraint system in a vehicle comprising:

an anchor plate adapted to be connected to vehicle structure;

a housing connected to said anchor plate;

at least one spring disposed in said housing;

at least one magnet disposed in said housing;

a Hall effect sensor disposed in said housing and cooperable with said at least one magnet;

a movable mechanism disposed in said housing and cooperable with belt webbing of the seat restraint system and said at least one spring to move the at least one magnet relative to the Hall effect sensor to change an output of the Hall effect sensor to indicate a first tension level and a second tension level in the seat restraint system when said at least one spring is deflected;

said housing having a cavity with an aperture communicating with said cavity; and wherein said movable mechanism comprises a tongue plate extending through said aperture and having a first end disposed in said cavity of said housing and a second end disposed outside said housing for connection to the belt webbing.

15. A dual level tension sensing assembly as set forth in claim 14 wherein said movable mechanism further comprises a movable actuator disposed in said cavity of said housing and cooperating with said tongue plate.

16. A dual level tension sensing assembly as set forth in claim 15 wherein said first second end of said tongue plate has an aperture extending therethrough to receive said at least one spring and said actuator.

17. A dual level tension sensing assembly as set forth in claim 12 including a plurality of springs cooperating with said movable mechanism.

18. A dual level tension sensing assembly for a seat restraint system in a vehicle comprising:

an anchor plate adapted to be connected to vehicle structure;

a housing connected to said anchor plate;

at least one magnet disposed in said housing;

a Hall effect sensor disposed in said housing and cooperable with said at least one magnet;

a movable mechanism disposed in said housing and cooperable with belt webbing of the seat restraint system to move the at least one magnet relative to the Hall effect sensor to change an output of the Hall effect sensor to indicate a first tension level and a second tension level in the seat restraint system;

a plurality of springs disposed in said housing and cooperating with said movable mechanism; and wherein at least one of said springs is tuned to a predetermined force for a low tension condition and said at least another of said springs is tuned to a predetermined force for a high tension condition.

19. A dual level tension sensing assembly as set forth in claim 18 wherein said predetermined force for said low tension condition is zero pounds to eight pounds and said predetermined force for said high tension condition is eight pounds to thirty pounds.

20. A seat restraint system for a vehicle comprising:

a seat restraint webbing;

an anchor plate adapted to be connected to vehicle structure;

a housing connected to said anchor plate;

a first spring disposed in said housing tuned to a predetermined force for a first tension level;

a second spring disposed in said housing tuned to a predetermined force for a second tension level;

at least one magnet disposed in said housing;

a Hall effect sensor disposed in said housing and cooperable with said at least one magnet; and a movable mechanism disposed in said housing and cooperable with said seat restraint webbing of the seat restraint system and said first spring and said second spring to move the at least one magnet relative to the Hall effect sensor to change an output of the Hall effect sensor to indicate the first tension level and the second tension level in the seat restraint system when said first spring and said second spring are deflected.

* * * * *